United States Patent
Clapp

(10) Patent No.: US 7,558,449 B2
(45) Date of Patent: Jul. 7, 2009

(54) ELECTRO-OPTICALLY TUNABLE OPTICAL FILTER

(75) Inventor: Terry Victor Clapp, Hertfordshire (GB)

(73) Assignee: Dow Corning Corporation, Inc., Auburn, MI (US)

( * ) Notice: Subject to any disclaimer, the term of this patent is extended or adjusted under 35 U.S.C. 154(b) by 219 days.

(21) Appl. No.: 10/564,134

(22) PCT Filed: Jul. 15, 2004

(86) PCT No.: PCT/GB2004/003090

§ 371 (c)(1),
(2), (4) Date: May 10, 2006

(87) PCT Pub. No.: WO2005/011171

PCT Pub. Date: Feb. 3, 2005

(65) Prior Publication Data

US 2007/0047872 A1 Mar. 1, 2007

(30) Foreign Application Priority Data

Jul. 17, 2003 (GB) ................................. 0316824.2

(51) Int. Cl.
  *G02B 6/28* (2006.01)
  *G02B 6/26* (2006.01)
(52) U.S. Cl. .......................................... 385/24; 385/31
(58) Field of Classification Search .................. None
See application file for complete search history.

(56) References Cited

U.S. PATENT DOCUMENTS

| | | | |
|---|---|---|---|
| 5,351,317 A | 9/1994 | Weber | 385/3 |
| 5,481,402 A | 1/1996 | Cheng et al. | 359/498 |
| 6,025,943 A * | 2/2000 | Meekers et al. | 398/1 |
| 6,212,315 B1 * | 4/2001 | Doerr | 385/31 |
| 6,285,810 B1 | 9/2001 | Fincato et al. | |
| 6,393,173 B1 * | 5/2002 | Doerr et al. | 385/16 |
| 6,574,391 B2 * | 6/2003 | Augustsson | 385/24 |
| 6,907,156 B1 * | 6/2005 | Madsen | 385/24 |
| 2003/0072512 A1 | 4/2003 | Nagaeda et al. | 385/11 |

FOREIGN PATENT DOCUMENTS

| | | |
|---|---|---|
| EP | 1 065 534 | 1/2001 |
| EP | 1065534 A1 * | 1/2001 |
| GB | 2 144 868 A | 3/1985 |

OTHER PUBLICATIONS

Herben, "Integrated Optoelectronics in Indium Phosphide Technology," *Tijdschrift van het Nederlands Elektronica—en Radiogenootschap*, vol. 66, pp. 37-43 (2001).
Great Britain Application No. 0316824.2 Search Report (Oct. 28, 2003).

* cited by examiner

*Primary Examiner*—Michelle R. Connelly-Cushwa
*Assistant Examiner*—Chris Chu
(74) *Attorney, Agent, or Firm*—Williams, Morgan & Amerson

(57) ABSTRACT

The present invention provides a method and apparatus for filtering an optical signal. The method includes receiving at least one input optical signal, forming first and second optical signals using the at least one input optical signal, and modifying at least one portion of the first optical signal using a plurality of non-waveguiding electro-optic phase adjusters. The method also includes forming an output optical signal by combining the first optical signal, including the at least one modified portion of the first optical signal, with the second optical signal.

14 Claims, 5 Drawing Sheets

ELECTRO-OPTICALLY TUNABLE OPTICAL FILTER

Figure 1A:
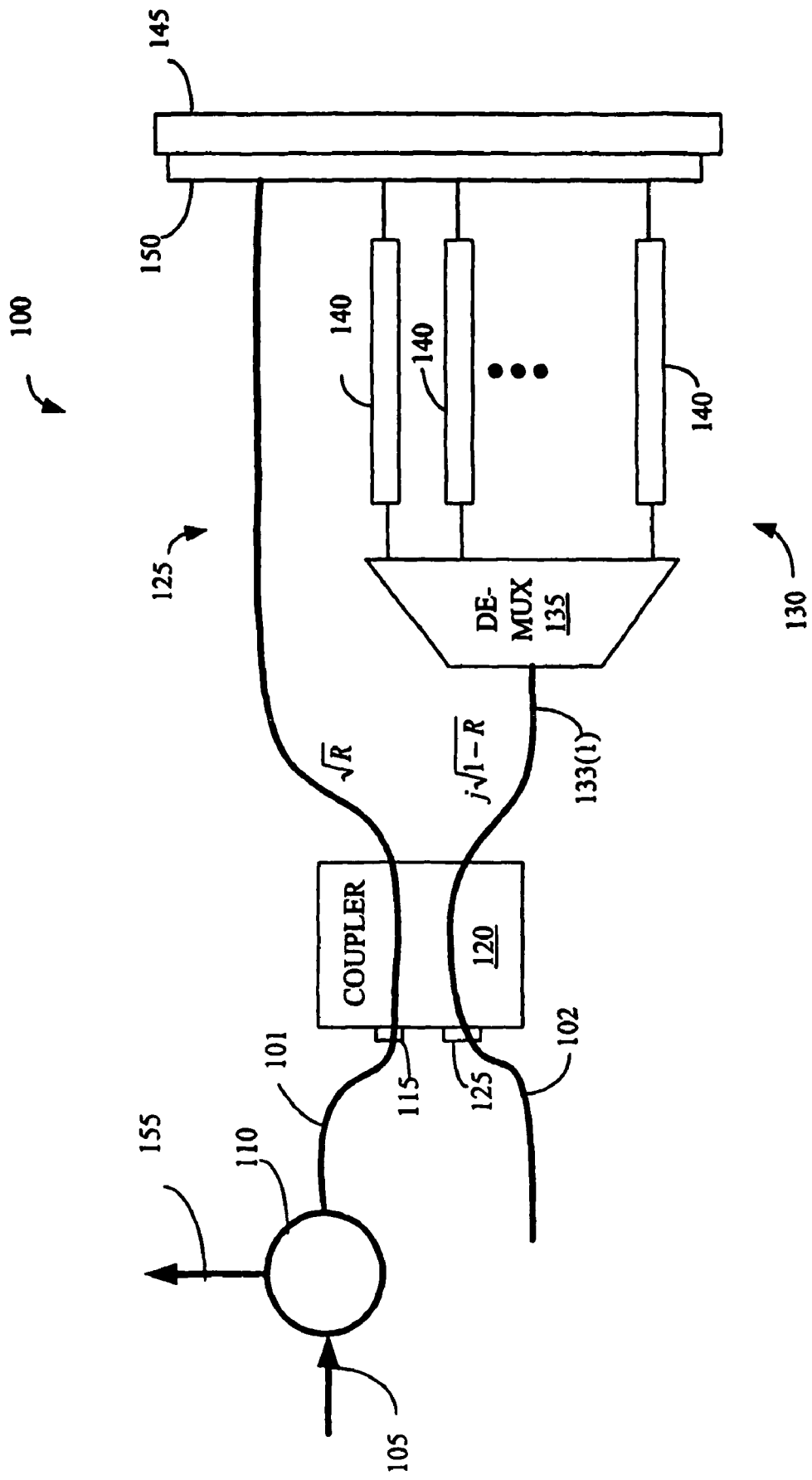

This invention relates generally to an optical transmission system, and, more particularly, to an electro-optically tunable optical filter for use in an optical transmission system.

Photonics, the use of light to store, transmit, and/or process information, is rapidly penetrating the market for commodity and high technology products. For example, optics is the transmission medium of choice for many metropolitan and local-area networks. To sustain bandwidth, and to allow different components of the optical transmission network to work together, optical transmission networks typically use sophisticated optical filters that may dynamically equalize the power on the wavelength, or frequency, channels of the networks. Exemplary optical filters that dynamically equalize power on a broad spectral feature basis include Mach-Zehnder filters, acousto-optic filters, holograms, and micro-mechanically driven mirrors. Exemplary optical filters that may dynamically equalize the power on a channel-by-channel basis include demultiplexers, arrays of programmable attenuators, multiplexers, and the like.

Optical filters may include one or more waveguides for transmitting light, as well as one or more elements that may adjust the phase of the light propagating in the waveguides. In traditional phase adjustable waveguides, a Joule heater is deployed proximate the waveguides and used to vary the temperature of the optical waveguide. The effective refractive index of the optics waveguide depends on the temperature of the waveguide, so varying the temperature changes the optical path length of the waveguide and thereby varies the phase of the light traveling in the optical waveguide. Thermo-optic phase adjustment is used in optical attenuators, spectrally selective filters, interferometers, and the like. For example, Doerr (U.S. Pat. No. 6,212,315) describes a channel power equalizer that uses thermo-optic phase adjustment in a plurality of phase shifters.

However, traditional methods of changing the phase of light propagating in a waveguide, including thermo-optic phase adjustment, may not be well-suited for spectral filtering applications. The sensitivity of temperature-dependent phase controllers may be limited by the relatively small thermo-optic coefficient of silica. Although other materials may exhibit larger thermo-optic coefficients, these may be difficult to form into low-loss single mode waveguides. Furthermore, thermo-optic methods of phase control may not respond fast enough to be integrated tightly with other electronic devices in the optical transmission network.

Furthermore, optical filters are often formed on a semiconductor substrate, and thermal crosstalk between multiple temperature-dependent phase controllers formed on the same semiconductor substrate may reduce the accuracy, finesse, and control of the temperature-dependent phase controllers. Consequently, fewer temperature-dependent phase controllers may be included on a single semiconductor substrate. Thermal crosstalk may also reduce the range of phase expression of the temperature-dependent phase controller. Although the reduction in the range of phase expression may be, at least in part, compensated for by increasing the range of temperatures applied to the phase controllers, increasing the temperature range typically results in a corresponding increase in power consumption of the device. Furthermore, the polarization independence of orthonormal modes may be reduced by thermal crosstalk.

In one aspect of the present invention, a method is provided for filtering an optical signal. The method includes receiving at least one input optical signal, forming first and second optical signals using the at least one input optical signal, and modifying at least one portion of the first optical signal using a plurality of non-waveguiding electro-optic phase adjusters. The method also includes forming an output optical signal by combining the first optical signal, including the at least one modified portion of the first optical signal, with the second optical signal.

In another aspect of the instant invention, an apparatus is provided. The apparatus includes an optical demultiplexer, a plurality of non-waveguiding electro-optic phase adjusters optically coupled to the optical demultiplexer, and an optical multiplexer optically coupled to the plurality of electro-optic phase adjusters.

In yet another aspect of the instant invention, an electro-optically tunable optical filter is provided. The electro-optically tunable optical filter includes a first optical transmission medium, a second optical transmission medium, and a first optical coupler for coupling portions of the first and second optical transmission media. The electro-optically tunable optical filter also includes an optical demultiplexer coupled to the second optical transmission medium, a plurality of non-waveguiding electro-optic phase adjusters optically coupled to the optical demultiplexer, and an optical multiplexer optically coupled to the plurality of non-waveguiding electro-optic phase adjusters. The electro-optically tunable optical filter further includes a third optical transmission medium optically coupled to the optical multiplexer and a second optical coupler for coupling portions of the second and the third optical transmission media.

Figure 1B:
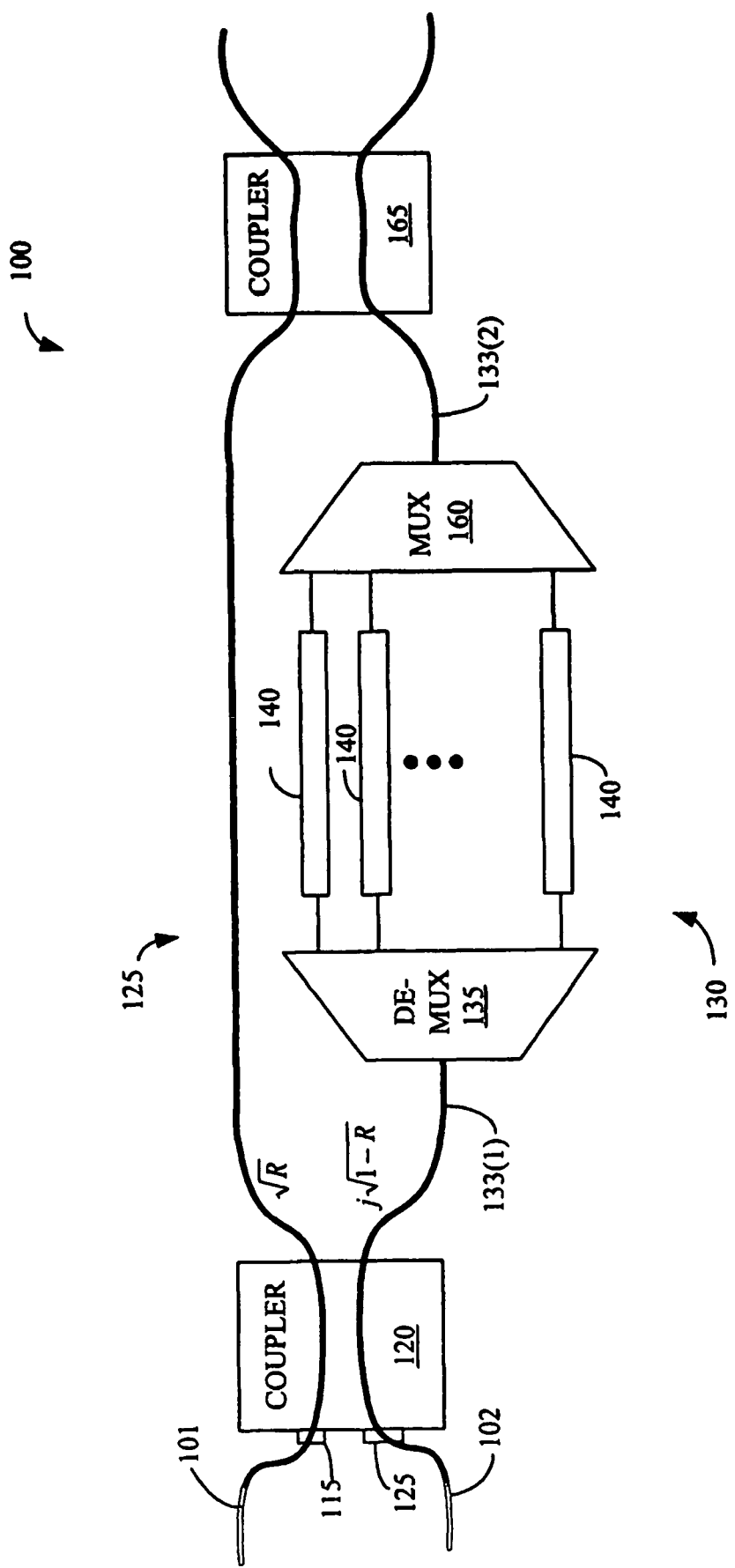
Figure 2:
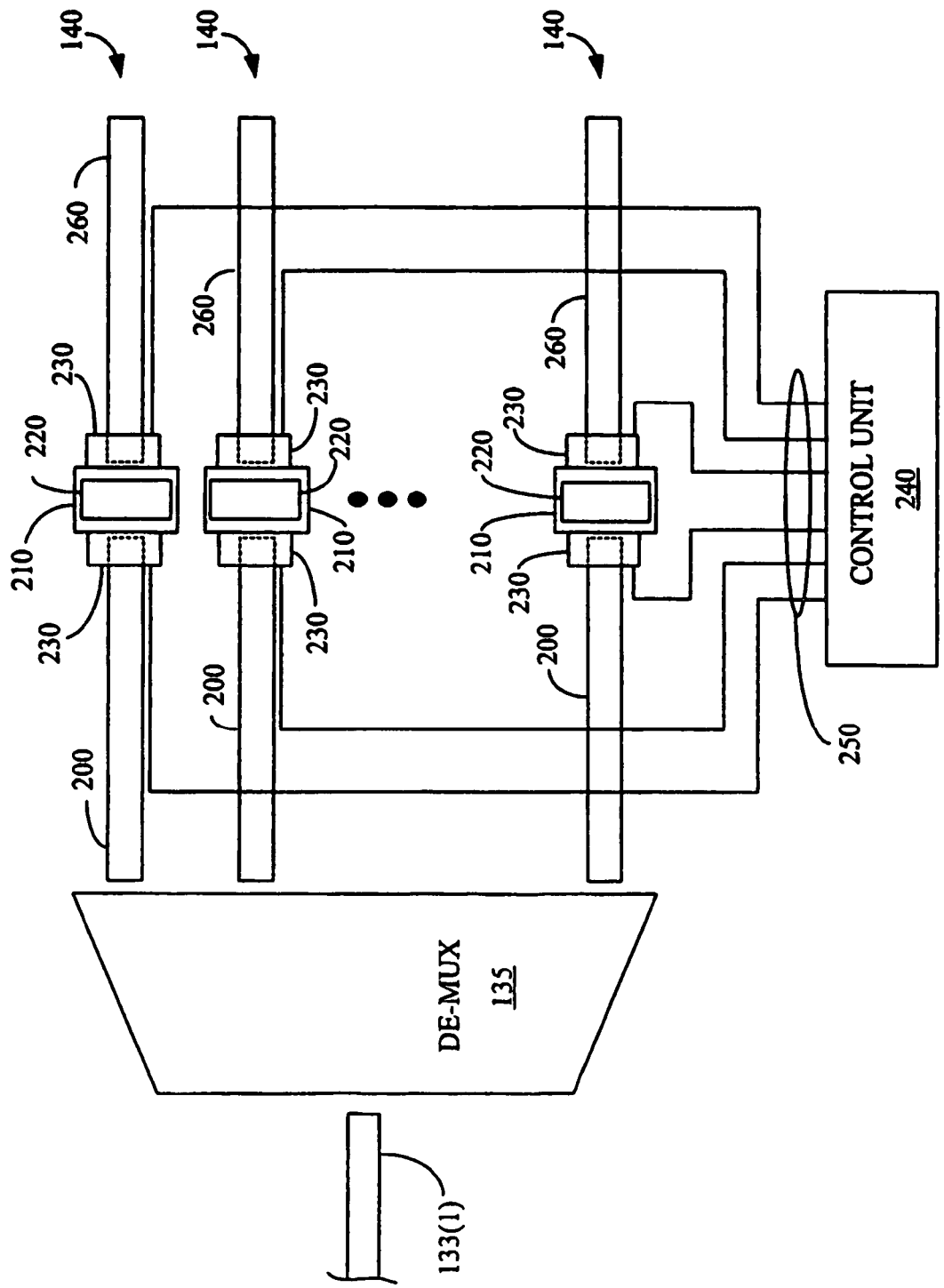
Figure 3:
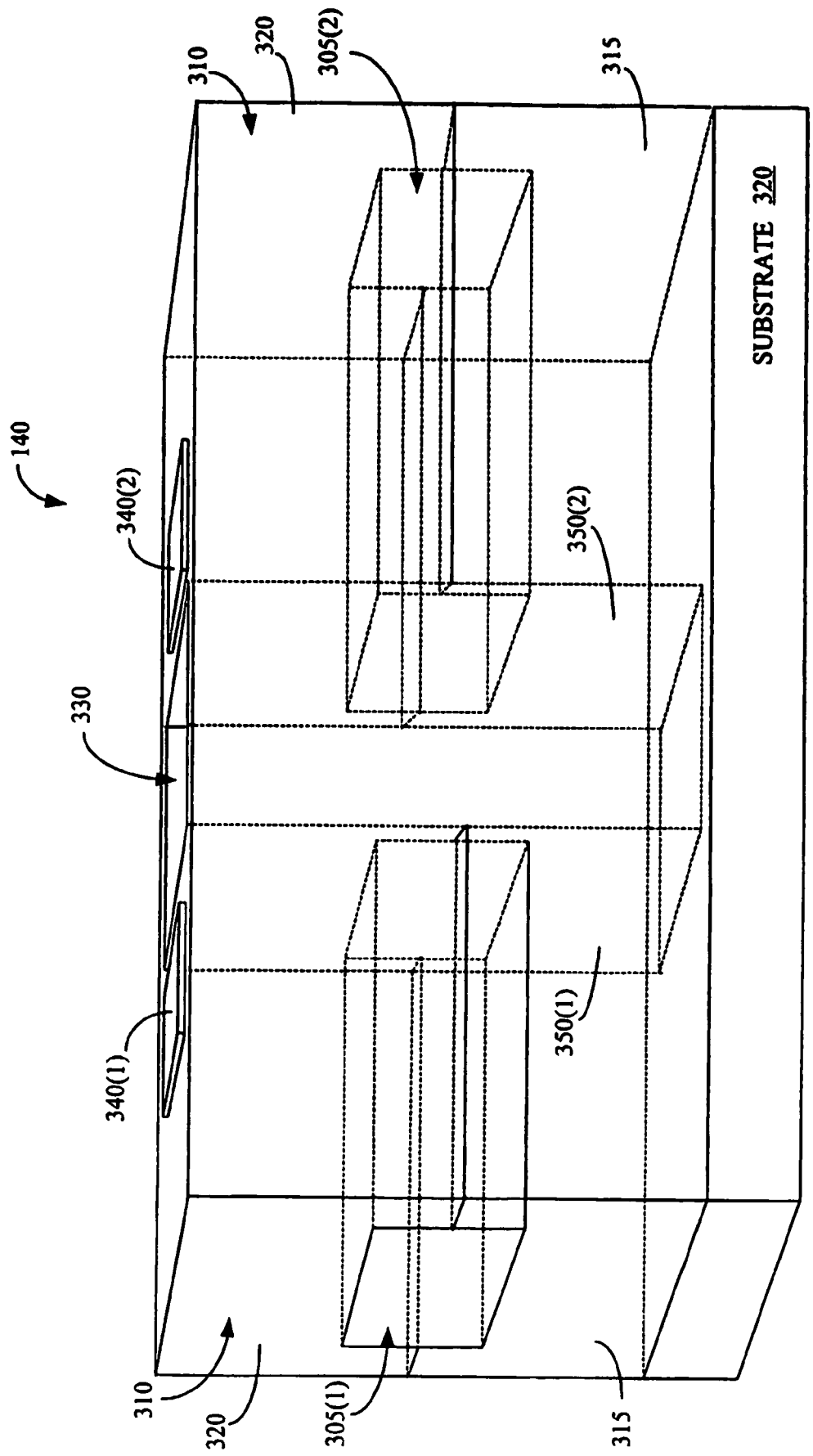
Figure 4:
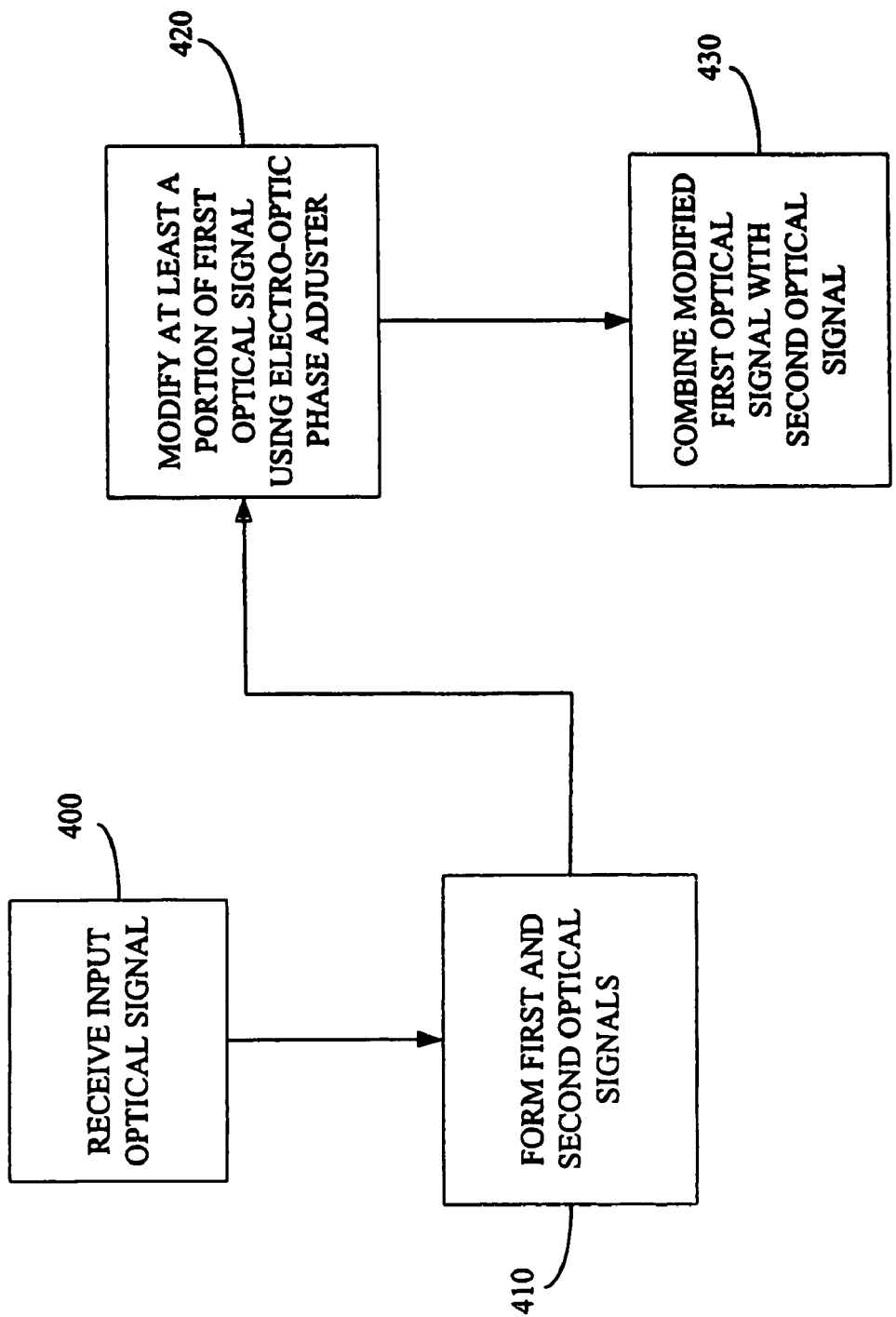

The invention may be understood by reference to the following description taken in conjunction with the accompanying drawings, in which like reference numerals identify like elements, and in which:

FIGS. 1A and 1B conceptually illustrate two exemplary embodiments of a dynamically and chromatically variable transmissivity apparatus, such as a dynamic gain flattening filter;

FIG. 2 conceptually illustrates a plurality of electro-optic phase adjusters that may be used in the dynamically and chromatically variable transmissivity apparatus shown in FIGS. 1A and 1B;

FIG. 3 conceptually illustrates a perspective view of one embodiment of the electro-optic phase adjusters shown in FIG. 2; and FIG. 4 illustrates one embodiment of an exemplary method of filtering an optical signal using the dynamically and chromatically variable transmissivity apparatus shown in FIGS. 1A and 1B.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1A conceptually illustrates a first exemplary embodiment of a dynamically and chromatically variable transmissivity apparatus, such as a dynamic gain flattening filter 100. Although the following description will be presented in the context of the embodiments of the dynamic gain flattening filters 100 shown in FIGS. 1A and 1B, the present invention is not so limited. In alternative embodiments, the variable transmissivity apparatus 100 may be one of variety of optical elements known to those of ordinary skill in the art. For example, the variable transmissivity apparatus 100 may be a channel equalizer for controlling channel powers in wavelength-division multiplexed systems, a Mach-Zehnder filter, a Michelson interferometer, and the like.

The first exemplary embodiment of the dynamic gain flattening filter 100 includes first and second optical transmission media 101, 102. In one embodiment, the first and second optical transmission media 101, 102 are waveguides. Although not necessary for the practice of the present invention, a first optical signal may enter the dynamic gain flattening filter 100 through a first port 105 in a non-reciprocal device 110. In one embodiment, the non-reciprocal device 110 is a circulator 101 that may be formed using materials having a high Verdet constant, as will be appreciated by those of ordinary skill in the art.

The non-reciprocal device 110 may be optically coupled to the waveguide 101 so that the first optical signal may be transmitted to the waveguide 101 and then enter the dynamic gain flattening filter 100 through a first port 115 in a first optical coupler 120. However, in alternative embodiments, the first optical signal may enter the dynamic gain flattening filter 100 without passing through the non-reciprocal device 110. Although not necessary for the practice of the present invention, a second optical signal propagating along the waveguide 102 may enter the dynamic gain flattening filter 100 through a second port 125 in the first optical coupler 120. In one embodiment, the first optical signal and, if present, the second optical signal, are wavelength division multiplexed optical signals.

The first optical coupler 120 may split and/or combine the first and second optical signals to form two signal components that are transmitted to upper and lower arms 125, 130 of the waveguides 101, 102, respectively. For example, if no second optical signal is provided to the dynamic gain flattening filter 100 via the waveguide 102, the first optical coupler 120 splits the first signal into the two signal components $\sqrt{R}$ and $j\sqrt{1-R}$, where R is a splitting ratio of the first optical coupler 120. The two signal components, $\sqrt{R}$ and $j\sqrt{1-R}$, are transmitted to the upper and lower arms 125, 130, respectively. In one embodiment, at least a portion of the upper and lower arms 125, 130 are waveguides. For example, the upper arm 125 may be waveguide. For another example, a first portion 133(1-2) of the lower arm 130 may be a waveguide.

The first portion 133(1) of the lower arm 130 is optically coupled to an optical demultiplexer 135. In one embodiment, the optical demultiplexer 135 receives the signal component $j\sqrt{1-R}$ from the lower arm 125 and splits the signal component $j\sqrt{1-R}$ into portions corresponding to a plurality of selected frequency and/or wavelength bands. For example, the signal component $j\sqrt{1-R}$ may have a bandwidth of 60 nm and be demultiplexed into 60 portions having a bandwidth of 1 nm. However, in alternative embodiments, a variety of devices well known to those of ordinary skill in the art may be used to split the signal component $j\sqrt{1-R}$ into portions corresponding to the plurality of selected frequency and/or wavelength bands. These devices may include, but are not limited to, optical splitters, prisms, gratings, and the like.

The optical demultiplexer 135 provides the portions of the signal component $j\sqrt{1-R}$ to a corresponding plurality of electro-optic phase adjusters 140, which are optically coupled to the optical demultiplexer 135. As will be appreciated by persons of ordinary skill in the art, the number of electro-optic phase adjusters 140 is a matter of design choice. Thus, although three electro-optic phase adjusters 140 are shown in FIG. 1, alternative embodiments of the present invention may include more or fewer electro-optic phase adjusters 140.

In the first exemplary embodiment of the dynamic gain flattening filter 100 shown in FIG. 1A, the plurality of electro-optic phase adjusters 140 are optically coupled to a mirror 145. The upper arm 125 is also optically coupled to the mirror 145. Although not necessary for the practice of the present invention, a wave plate 150 may be deployed adjacent the mirror 145 such that the two signal components $\sqrt{R}$ and $j\sqrt{1-R}$ propagating in the upper arm 125 and the electro-optic phase adjusters 140, respectively, pass through the wave plate 150 before reflecting from the mirror 145. For example, a quarter-wave plate 150 may be deployed between the mirror and the upper arm 125 and electro-optic phase adjusters 140. Incorporating the quarter-wave plate 150 may reduce, or null, birefringence in the portions of the signal component $j\sqrt{1-R}$.

The optical path length of the upper and lower arms 125, 130, may, in one embodiment, be approximately equal. For example, the optical path length of the upper arm 125 and lower arm 130, including the optical demultiplexer 135, the electro-optic phase adjusters 140, and the wave plate 150, may be equal to within about a few wavelengths of the first and, if present, the second optical signal. As will be discussed in detail below, the effective optical path length of the electro-optic phase adjusters 140, and consequently the optical path length of portions of the lower arm 130, may be controlled, or tuned, to modify the portions of the signal component $j\sqrt{1-R}$. In one embodiment, the effective optical path length of one or more of the electro-optic phase adjusters 140 may be varied so that one or more relative phase differences between the portions of the signal component $j\sqrt{1-R}$ are introduced. For example, a phase difference of $\pi/4$ may be introduced between two of the portions of the signal component $j\sqrt{1-R}$.

After the two signal components $\sqrt{R}$ and $j\sqrt{1-R}$ reflect from the mirror 145, they are transmitted back along approximately the same optical path to the first optical coupler 120. Consequently, the one or more relative phase differences between the portions of the signal component $j\sqrt{1-R}$ introduced by the electro-optic phase adjusters 140 may be approximately doubled. For example, if one of the electro-optic phase adjusters 140 introduces a phase difference of about $\pi/4$ between two of the portions of the signal component $j\sqrt{1-R}$ during a single pass, then a total phase difference of about $\pi/2$ may be introduced between the two of the portions of the signal component $j\sqrt{1-R}$.

In the first exemplary embodiment, the optical demultiplexer 135 may also function as an optical multiplexer for the reflected portions of the signal component $j\sqrt{1-R}$. For example, the optical demultiplexer 135 may combine to reflected portions of the signal component $j\sqrt{1-R}$ to form the modified signal component $j\sqrt{1-R}$. The first optical coupler 120 may combine and/or split the signal component $\sqrt{R}$ and the modified signal component $j\sqrt{1-R}$ to form an output signal. For example, the signal component $\sqrt{R}$ and the modified signal component $j\sqrt{1-R}$ may interfere destructively and/or constructively to form a filtered output signal. In one embodiment, the filtered output signal may be provided to the non-reciprocal device 110 and may then exit the dynamic gain flattening filter via a second port 155. However, as discussed above, the non-reciprocal device 110 is optional and may be omitted in alternative embodiments of the present invention.

FIG. 1B shows a second exemplary embodiment of the dynamic gain flattening filter 100. In the second exemplary embodiment of the dynamic gain flattening filter 100, the plurality of electro-optic phase adjusters 140 are optically coupled to an optical multiplexer 160. Portions of the signal component $j\sqrt{1-R}$, including any modified portions, may be provided to the optical multiplexer 160. In one embodiment, the optical multiplexer 160 may combine the portions to form a modified signal component $j\sqrt{1-R}$.

In the second exemplary embodiment of the dynamic gain flattening filter 100, the signal component $\sqrt{R}$ and the modified signal component $j\sqrt{1-R}$ propagating in the upper and lower arms 125, 130, respectively, are provided to a second optical coupler 165, which may split and/or combine the signal component $\sqrt{R}$ and the modified signal component $j\sqrt{1-R}$. For example, the signal component $\sqrt{R}$ and the modified signal component $j\sqrt{1-R}$ may interfere destructively and/or constructively to form a filtered output signal. In one embodiment, the first and second optical couplers 120, 165 have the same splitting ratio, R, although this is not necessary for the practice of the present invention. Furthermore, the second optical coupler 165 may be omitted in various alternative embodiments of the present invention.

The optical path length of the upper and lower arms 125, 130 may, in one embodiment, be approximately equal. For example, the optical path length of the upper arm 125 and lower arm 130, including the optical demultiplexer 135, the electro-optic phase adjusters 140, and the optical multiplexer 145, may be equal to within about a few wavelengths of the first and, if present, the second optical signal. As will be discussed in detail below, the effective optical path length of the electro-optic phase adjusters 140, and consequently the optical path length of portions of the lower arm 130, may be controlled, or tuned, to modify the portions of the signal component $j\sqrt{1-R}$. In one embodiment, the effective optical path length of one or more of the electro-optic phase adjusters 140 may be varied so that one or more relative phase differences between the portions of the signal component $j\sqrt{1-R}$ are introduced. For example, a phase difference of $\pi/4$ may be introduced between two of the portions of the signal component $j\sqrt{1-R}$.

In either the first or the second exemplary embodiments shown in FIGS. 1A and 1B, respectively, one or more components of the dynamic gain flattening filter 100 may be formed on a single planar waveguide platform (not shown). For example, the optical demultiplexer 135, the plurality of electro-optic phase adjusters 140, and the mirror 150 or the optical multiplexer 160 may be formed on the planar waveguide platform. In various alternative embodiments, the planar waveguide platform may be formed of a polymer, silica-on-silicon, a semiconductor, or like materials.

At least in part because of the fast response time of the plurality of electro-optic phase adjusters 140, the two embodiments of the dynamic gain flattening filter 100 shown in FIGS. 1A and 1B may be integrated tightly with other electronic devices. Furthermore, the number of electro-optic phase adjusters 140 that may be formed on a single platform may be increased because thermal crosstalk between multiple electro-optic phase adjusters 140 may be reduced relative to, e.g., a plurality of thermo-optic phase adjusters. The electro-optic phase adjusters 140 may also have an increased range of phase expression and/or reduced power consumption compared to, e.g., a plurality of thermo-optic phase adjusters.

FIG. 2 conceptually illustrates the plurality of electro-optic phase adjusters 140, in accordance with one embodiment of the present invention. As discussed above, in one embodiment, the signal component $j\sqrt{1-R}$ is provided to the optical demultiplexer 135 via the first portion 133(1) of the lower arm 130. In the illustrated embodiment, the optical demultiplexer 135 is optically coupled to a plurality of optical transmission media, such as waveguides 200, which may be deployed proximate a corresponding plurality of slots 210. In one embodiment, an end of the waveguide 200 may be deployed proximate the slot 210 so that the waveguide 200 is optically coupled to the slot 210 and may provide portions of the signal component $j\sqrt{1-R}$ to the slot 210. For example, each of the waveguides 200 may provide a portion of the signal component $j\sqrt{1-R}$ having a wavelength, or a frequency, approximately within a selected wavelength, or frequency, band to the corresponding one of the plurality of slots 210.

An electro-optically active phase adjusting element 220 may be positioned in at least a portion of the slot 210. In one embodiment, the electro-optically active phase adjusting element 220 may be an electro-optically active material such as a liquid crystal, a polymer-dispersed liquid crystal, a birefringent material, and the like, which may be located in the slot 210. However, any desirable type of electro-optically active phase adjusting element 220 may be used. For example, in one alternative embodiment, the electro-optically active phase adjusting element 220 may be a silicon substrate having an opening that is filled with an electro-optically active material. In this alternative embodiment, the electro-optically active phase adjusting element 220 may be formed separately and subsequently inserted into the electro-optic phase adjusters 140.

One or more electrodes 230 are deployed proximate the slot 210. In the illustrated embodiment, two electrodes 230 are deployed near the slot and above at least a portion (drawn in ghosted lines) of the waveguide 200. However, the present invention is not so limited. In alternative embodiments, more or fewer electrodes 230 may be deployed proximate the slot 210. Furthermore, in other alternative embodiments, at least a portion of the electrodes 230 may be deployed within the slot 210.

The electrodes 230 are coupled to a control unit 240 via lines 250. In various alternative embodiments, the lines 250 may be wires, conductive traces, and the like. The control unit 240 may provide selected signals, such as voltages and/or currents, to the electrodes 230. As will be appreciated by those of ordinary skill in the art, the signals provided by the control unit 240 may be used to vary the optical path length of the electro-optically active phase adjusting element 220. For example, applying a voltage to one or more of the electrodes 230 may create an electric field, and at least a portion of the electric field may penetrate into the slot 210. Varying the strength of the signal, e.g. the voltage, may change the amplitude and/or orientation of the electric field, which may change the optical path length of the electro-optically active phase adjusting element 220.

A phase of one or more of the portions of the signal component $j\sqrt{1-R}$ may be modified when the portions of the signal component $j\sqrt{1-R}$ propagate through the electro-optically active phase adjusting element 220. In one embodiment, a relative phase difference may be introduced between the portions of the signal component $j\sqrt{1-R}$ by providing different signals to the electrodes 230 deployed proximate the slots 210 corresponding to the appropriate portions of the signal component $j\sqrt{1-R}$. For example, a relative phase difference may be introduced between two portions of the signal component $j\sqrt{1-R}$ by varying the strength of the signal provided to the corresponding slots 210 such that the optical path length of the slot 210 corresponding to a first portion of the signal component $j\sqrt{1-R}$ differs from the optical path length of the slot 210 corresponding to a second portion of the signal component $j\sqrt{1-R}$ by approximately one quarter of a wavelength of the signal component $j\sqrt{1-R}$.

Another plurality of optical transmission media, such as waveguides 260, may be deployed proximate the slot 210. In one embodiment, an end of the waveguide 260 may be deployed proximate the slot 210 so that the waveguide 260 is optically coupled to the slot 210 and may receive the portions of the signal component $j\sqrt{1-R}$ from the slot 210. In one embodiment, a portion (drawn in ghosted lines) of the waveguide 260 may be positioned beneath one or more of the electrodes 230. In the first exemplary embodiment of the dynamic gain flattening filter 100, shown in FIG. 1A, the waveguides 260 may be optically coupled to the mirror 145 and/or the wave plate 150. Alternatively, in the second exemplary embodiment of the dynamic gain flattening filter 100, shown in FIG. 1B, the waveguides 260 may be optically coupled to the multiplexer 160, which may, as discussed above, split and/or combine the portions of the signal component $j\sqrt{1-R}$.

The slot 210 and the electro-optically active phase adjusting element 220 are, in one embodiment, non-waveguiding. Thus, although waveguiding elements, such as the waveguides 200, 260, may be included in the plurality of electro-optic phase adjusters 140, the electro-optic phase adjusters 140 are referred to hereinafter as "non-waveguiding" electro-optic phase adjusters 140.

FIG. 3 conceptually illustrates a perspective view of one embodiment of the electro-optic phase adjuster 140. In the illustrated embodiment, one or more waveguide portions 305 (1-2) are formed within a dielectric layer, commonly referred to in the art as a cladding layer 310, which is formed above a semiconductor substrate 320, such as silicon. It should be appreciated that the configuration of the electro-optic phase adjuster 140 is exemplary in nature, and that in alternative embodiments, the electro-optic phase adjuster 140 may include other components not shown in FIG. 3.

The waveguide portions 305(1-2) shown in the illustrated embodiment are formed of material having a refractive index that is larger than a refractive index of the cladding layer 310. For example, the waveguide portions 305(1-2) may be formed of un-doped silica having a refractive index of about 1.4557 and the cladding layer 310 may be formed of doped or un-doped silica having a refractive index of about 1.445. In other embodiments, the waveguide portions 305(1-2) and the cladding layer 310 may be formed of any desirable materials. In one embodiment, the cladding layer 310 may include an under cladding layer (not shown) formed, at least in part, in a region 315 beneath the waveguide portions 305(1-2) and an upper cladding layer (not shown) formed, at least in part, in a region 320 above the waveguide portions 305(1-2). In one embodiment, the upper cladding layer and the under cladding layer do not have the same refractive index. For example, the upper cladding layer may have a refractive index of about 1.4448 and the under cladding layer may have a refractive index of about 1.4451.

A slot 330 is incised in the cladding layer 310 so that the waveguide portions 305(1-2) terminate proximate the slot 330. However, in alternative embodiments, the waveguide portions 305(1-2) may not terminate proximate the slot 330. For example, a part of the waveguide portions 305(1-2) may be proximate the slot 330 even though the waveguide portions 305(1-2) terminate at a location spaced from the slot 330. In one embodiment, the slot 330 is incised so that an evanescent field amplitude due to the signals propagating in the waveguide portions 305(1-2) at transverse edges 350(1-2) of the slot 330 is less than −40 dB of the peak value. However, the precise location of the slot 330 and the desired evanescent field amplitude at the transverse edges 350(1-2) are matters of design choice. Furthermore, although the slot 330 is depicted as rectangular in FIG. 3, the geometry of the slot 330 is a matter of design choice, taking on any of a variety of geometric cross sectional configurations and even varying in cross sectional configuration along its length.

FIG. 4 illustrates one embodiment of an exemplary method of filtering an optical signal using, for example, the dynamic gain flattening filter 100 shown in FIGS. 1A and 1B. The illustrated embodiment of the method includes receiving (at 400) at least one input optical signal. First and second optical signals are then formed (at 410) using the at least one input optical signal. For example, the optical coupler 110 shown in FIGS. 1A and 1B may form the two signal components $\sqrt{R}$ and $j\sqrt{1-R}$ using the input optical signal. As discussed in detail above, at least one portion of the first optical signal may be modified (at 420) using a plurality of electro-optic phase adjusters, such as the electro-optic phase adjusters 140 shown in FIGS. 1A and 1B. An output optical signal may then be formed (at 430) by combining the first optical signal, including the at least one modified portion of the first optical signal, with the second optical signal.

By using one or more embodiments of the dynamic gain flattening filter 100 including electro-optic phase adjusters 140, as discussed in detail above, the accuracy, finesse, and control of the dynamic gain flattening filter 100 may be increased relative to, e.g., thermo-optic phase controllers. For example, a larger number of electro-optic phase adjusters 140 may be included in a dynamic gain flattening filter 100 that is formed on a single semiconductor substrate. The range of phase expression of the electro-optic phase adjusters 140 may also be increased without necessarily requiring a corresponding increase in power consumption of the device. The polarization independence of orthonormal modes of signals propagating in the dynamic gain flattening filter 100 may also be improved.

Furthermore, the future development of adaptive filter components such as the variable transmissivity apparatus 100 is, at least in part, likely to be driven by the increasing sophistication of signaling paradigms adopted for use in access and metropolitan networks, as well as transmission backbones. It is anticipated that the current invention, perhaps in conjunction with other developments, foreseen and unforeseen, may permit a much greater range of these applications to be addressed. In particular, the greater finesse and lower power requirements may facilitate the adoption of this approach in highly functional assemblies in access and metropolitan networks, as well as transmission backbones.

The invention claimed is:

1. An apparatus, comprising:
   a coupler for coupling an optical signal into a first arm and a second arm;
   wherein the first arm includes:
   an optical demultiplexer;
   a plurality of non-waveguiding electro-optic phase adjusters optically coupled to the optical demultiplexer; and
   a control unit coupled to the plurality of electro-optic phase adjusters;
   further comprising:
   a mirror; and
   a quarter-wave plate coupled between the mirror and the electro-optic phase adjusters on the other side of the phase adjusters to the demultiplexer so that an optical signal passes from the demultiplexer through the electro-optic phase adjusters, the quarter-wave plate and is then reflected back by the mirror through the quarter-wave plate, the electro-optic phase adjusters and the optical demultiplexer; and the second arm includes a waveguide linking the coupler to the quarter wave plate for passing an optical signal in the second arm through the quarter wave plate to be reflected by the mirror back through the quarter wave plate and second arm to the coupler where the optical signals in the first and second arms are recombined.

2. The apparatus of claim 1, wherein the optical demultiplexer, the plurality of non-waveguiding electro-optic phase adjusters, and the control unit are formed on a planar waveguide platform.

3. The apparatus of claim 2, wherein the planar waveguide platform is at least one of a polymer, a silica-on-silicon, or a semiconductor waveguide platform.

4. The apparatus of claim 1, wherein each of the plurality of non-waveguiding electro-optic phase adjusters comprise:
- a first optical transmission medium;
- a second optical transmission medium;
- a slot disposed adjacent to the first and second optical transmission media, the slot being adapted to receive an electro-optically active element; and
- at least one electrode deployed proximate the slot, the at least one electrode being adapted to provide at least a portion of a variable electric field within the slot.

5. The apparatus of claim 4, wherein the slot has at least one curved edge.

6. The apparatus of claim 4, wherein the first optical transmission medium is a wave guide.

7. The apparatus of claim 4, wherein the second optical transmission medium is a waveguide.

8. The apparatus of claim 4, wherein the electro-optically active element is at least one of a liquid crystal and a polymer-dispersed liquid crystal.

9. The apparatus of claim 1, wherein the control unit is capable of providing at least one signal indicative of a desired phase change to at least one of the plurality of non-waveguiding electro-optic phase adjusters.

10. The apparatus of claim 1, wherein the optical demultiplexer is adapted to provide light in a plurality of selected frequency bands to a corresponding plurality of non-waveguiding electro-optic phase adjusters.

11. The apparatus of claim 10, wherein the optical multiplexer is adapted to receive light in the plurality of selected frequency bands from the corresponding plurality of non-waveguiding electro-optic phase adjusters.

12. The apparatus of claim 1, further comprising an optical multiplexer optically coupled to the plurality of electro-optic phase adjusters.

13. The apparatus of claim 12, wherein the optical multiplexer is adapted to combine the light received in the plurality of selected frequency bands.

14. The apparatus of claim 13, wherein the optical demultiplexer and the optical multiplexer are a single device.

* * * * *